US012783306B2

(12) United States Patent
Wang

(10) Patent No.: US 12,783,306 B2
(45) Date of Patent: Nov. 3, 2026

(54) OPTIMIZATION OF SCRATCHPAD MEMORY ALLOCATION FOR HETEROGENEOUS DEVICES USING A COOPERATIVE COMPILER FRAMEWORK

(71) Applicant: MediaTek Inc., Hsinchu City (TW)

(72) Inventor: Chi-Wei Wang, Hsinchu City (TW)

(73) Assignee: MediaTek Inc., Hsinchu City (TW)

( * ) Notice: Subject to any disclaimer, the term of this patent is extended or adjusted under 35 U.S.C. 154(b) by 849 days.

(21) Appl. No.: 17/969,397

(22) Filed: Oct. 19, 2022

(65) Prior Publication Data

US 2024/0134691 A1 Apr. 25, 2024
US 2024/0231910 A9 Jul. 11, 2024

(51) Int. Cl.
*G06F 9/50* (2006.01)
*G06F 8/41* (2018.01)

(52) U.S. Cl.
CPC ............ *G06F 9/5016* (2013.01); *G06F 8/441* (2013.01)

(58) Field of Classification Search
CPC ........ G06F 9/5016; G06F 8/441; G06N 3/063
See application file for complete search history.

(56) References Cited

U.S. PATENT DOCUMENTS 11,592,817 B2 2/2023 Appu
11,809,849 B1 * 11/2023 Zheng ..................... G06F 8/452
2019/0286973 A1 * 9/2019 Kovvuri ................... G06N 3/04
2019/0391796 A1 * 12/2019 Brady ..................... G06F 8/458

FOREIGN PATENT DOCUMENTS

CN 112463160 A 3/2021
CN 112527304 A 3/2021

OTHER PUBLICATIONS

Zhang et al., Duet: A Compiler-Runtime Subgraph Scheduling Approach for Tensor Programs on a Coupled CPU-GPU Architecture, May 17-21, 2021, <https://ieeexplore.ieee.org/stamp/stamp.jsp?tp=&arnumber=9460468&tag=1>, pp. 1-11 (Year: 2021).*
Pal et al., OnSRAM: Efficient Inter-Node On-Chip Scratchpad Management in Deep Learning Accelerators, Oct. 18, 2022, <https://dl.acm.org/doi/pdf/10.1145/3530909>, pp. 1-29 (Year: 2022).*
KS McKinley, et al., Compiler Architectures for Heterogeneous Systems, 8th workshop for languages and compilers for parallel computing, Aug. 1995, Ohio, USA.
C Rossbach, et al., Dandelion: a Compiler and Runtime for Heterogeneous Systems, SOSP'13, Nov. 3-6, 2013, Farmington, Pennsylvania, USA.

* cited by examiner

*Primary Examiner* — Aimee Li
*Assistant Examiner* — Hsing Chun Lin
(74) *Attorney, Agent, or Firm* — Tong J. Lee

(57) ABSTRACT

A system allocates scratchpad memory (SPM) to heterogeneous devices for neural network computing. The system executes the operations of a global optimization manager. The global optimization manager receives compilation states from compilers, which compile corresponding subgraphs of a neural network model into corresponding subcommands that run on the heterogeneous devices. The global optimization manager unifies records of a same object across different ones of the compilation states, and allocates the SPM to the subgraphs according to the unified records of the compilation states.

18 Claims, 8 Drawing Sheets

(A)

Tensor & Access Records 610

Tensor Record 711

| TensorID | Size | DataType | Pitch | Category |
|---|---|---|---|---|
| 1 | 1024 | ... | ... | "Input" |
| 2 | 2048 | ... | ... | "Variable" |
| 3 | 512 | ... | ... | "Output" |

Access Record 712

| | | |
|---|---|---|
| Read | 1 | 2 |
| Write | 2 | 3 |

(B)

Tensor & Access Records 620

Tensor Record 721

| TensorID | Size | DataType | Pitch | Category |
|---|---|---|---|---|
| A | 512 | ... | ... | "Input" |
| B | 128 | ... | ... | "Variable" |
| C | 256 | ... | ... | "Variable" |
| D | 128 | ... | ... | "Variable" |
| E | 64 | ... | ... | "Output" |

Access Record 722

| | | | | |
|---|---|---|---|---|
| Read | A | B | C | D |
| Write | B | C | D | E |

(C)

Tensor & Access Records 630

Tensor Record 731

| TensorID | Size | DataType | Pitch | Category |
|---|---|---|---|---|
| i | 512 | ... | ... | "Input" |
| ii | 128 | ... | ... | "Variable" |
| iii | 256 | ... | ... | "Variable" |
| iv | 32 | ... | ... | "Output" |

Access Record 732

| | | | |
|---|---|---|---|
| Read | i | ii | iii |
| Write | ii | iii | iv |

FIG. 7

OPTIMIZATION OF SCRATCHPAD MEMORY ALLOCATION FOR HETEROGENEOUS DEVICES USING A COOPERATIVE COMPILER FRAMEWORK

TECHNICAL FIELD

Embodiments of the invention relate to a global optimization scheme for compile-time scratchpad memory allocation to heterogeneous devices.

BACKGROUND

Scratchpad memory (SPM) is a high-speed on-chip memory that is often used in real-time embedded systems or for special-purpose computing. An SPM provides better timing predictability and lower energy consumption than a cache memory of the same capacity. One typical use for SPM is to store temporary data or calculation results that do not need to be committed to the main memory.

SPMs have been widely used in both single-core processors and multicore processor systems. SPM allocation can be performed at compile time. There are existing algorithms for allocating SPMs to hotspots in programs to fully ensure timing predictability.

Certain special-purpose computing, such as neural network computing, is suited for execution by heterogeneous devices. To prepare a neural network model for execution by heterogeneous devices, the neural network model is compiled by multiple compilers that are target-specific. Each compiler compiles a portion of the neural network model for execution by its target device. To avoid data hazards, conservative SPM allocation algorithms do not allow SPM locations that have been allocated to one compiler to be reused by another compiler. The lack of reuse is wasteful of limited SPM resources. Thus, there is a need for improving the existing SPM allocation algorithms for heterogeneous devices.

SUMMARY

In one embodiment, a method is provided for allocating scratchpad memory (SPM) to heterogeneous devices for neural network computing. The method includes the step of receiving compilation states from multiple compilers, which compile corresponding subgraphs of a neural network model into corresponding subcommands that run on the heterogeneous devices. The method further includes the steps of unifying records of a same object across different ones of the compilation states, and allocating the SPM to the subgraphs according to the unified records of the compilation states.

In another embodiment, a system is operative to allocate SPM to heterogeneous devices for neural network computing. The system includes processing hardware, and memory to store instructions. When executed by the processing hardware, the instructions cause the processing hardware to perform operations of multiple compilers and a global optimization manager. The global optimization manager is operative to: receive compilation states from the compilers, which compile corresponding subgraphs of a neural network model into corresponding subcommands that run on the heterogeneous devices; unify records of a same object across different ones of the compilation states; and allocate the SPM to the subgraphs according to the unified records of the compilation states.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 7 illustrates examples of tensor records and access records according to one embodiment.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a platform for compilers to cooperatively obtain scratchpad memory (SPM) allocation for heterogeneous computing. The compilers operate to compile a neural network (NN) model into subcommands for execution by heterogeneous devices. The platform includes a global optimization manager to collect compilation states from the compilers, and to optimize the SPM allocation at compile time based on the compilation states. In one embodiment, the compilation states include tensor records and access records.

An NN model can be described by a directed acyclic graph (DAG), which can be partitioned into multiple subgraphs. Each subgraph is compiled by a corresponding compiler into a corresponding subcommand that runs on a corresponding device in a heterogeneous computing system. In the following description, the terms "device" and "processor" are used interchangeably. A processor may be a core, a processing unit, a processing element, or any processing hardware that executes subcommands compiled by a target-specific compiler.

Figure 1:
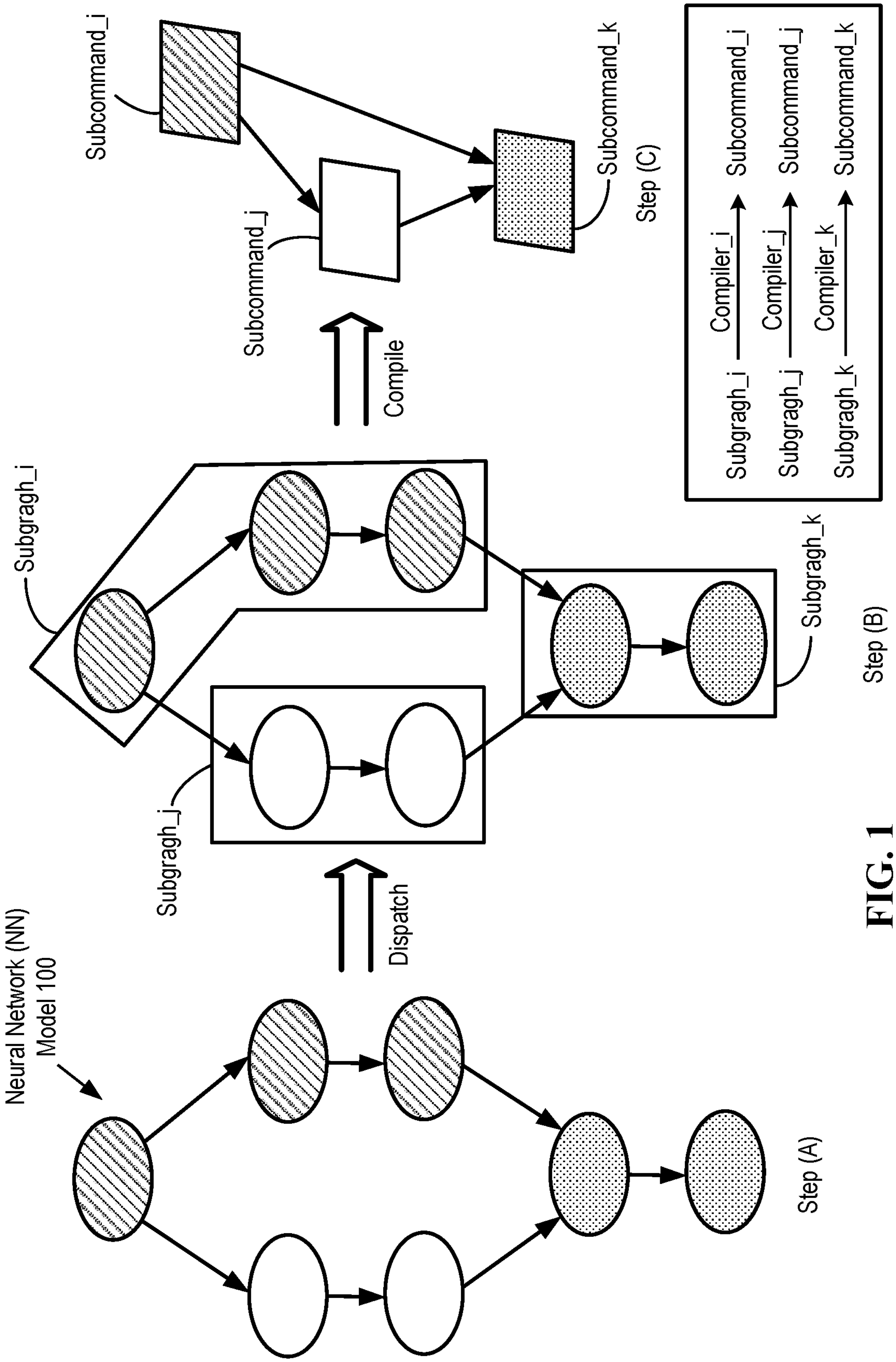
FIG. 1 is a diagram illustrating a process of compiling a neural network (NN) model according to one embodiment.

FIG. 1 is a diagram illustrating a process of compiling an NN model 100 according to one embodiment. Step (A) of the process includes receiving NN model 100 as input. NN model 100 is represented by a DAG, where each node of the DAG represents a task that includes one or more operations (OPs) and tensor operands. Each edge of the graph represents the dependency between adjacent nodes. Non-limiting examples of the OPs include convolution, pooling, concatenation, normalization, etc. Each OP is executed by a device, and different OPs may be executed by different devices. The DAG can be partitioned into multiple subgraphs (e.g., subgraph_i, subgraph_j, and subgraph_k). Each subgraph is also a DAG and represents the OPs that can be executed by the same device. Step (B) of the process includes dispatching the subgraphs to respective compilers (e.g., compiler_i, compiler_j, and compiler_k). Step (C) of the process includes the compilers compiling the subgraphs into corresponding subcommands (e.g., subcommand_i, subcommand_j, and subcommand_k). Each compiler is target-specific; that is, it compiles for a specific target device. Thus, the subcommands compiled by different compilers are to be executed by different target devices.

A heterogeneous computing system may include target devices (e.g., processors) that use different data formats. For example, a first processor may store or transmit data in a first format (e.g., placing/sending each four-byte data item followed by skipping the next four bytes), and a second processor may read data in continuous bytes. Data format inconsistency can be detected at the input/output point between two subgraphs and can be resolved at compile time as shown in FIG. 2.

Figure 2:
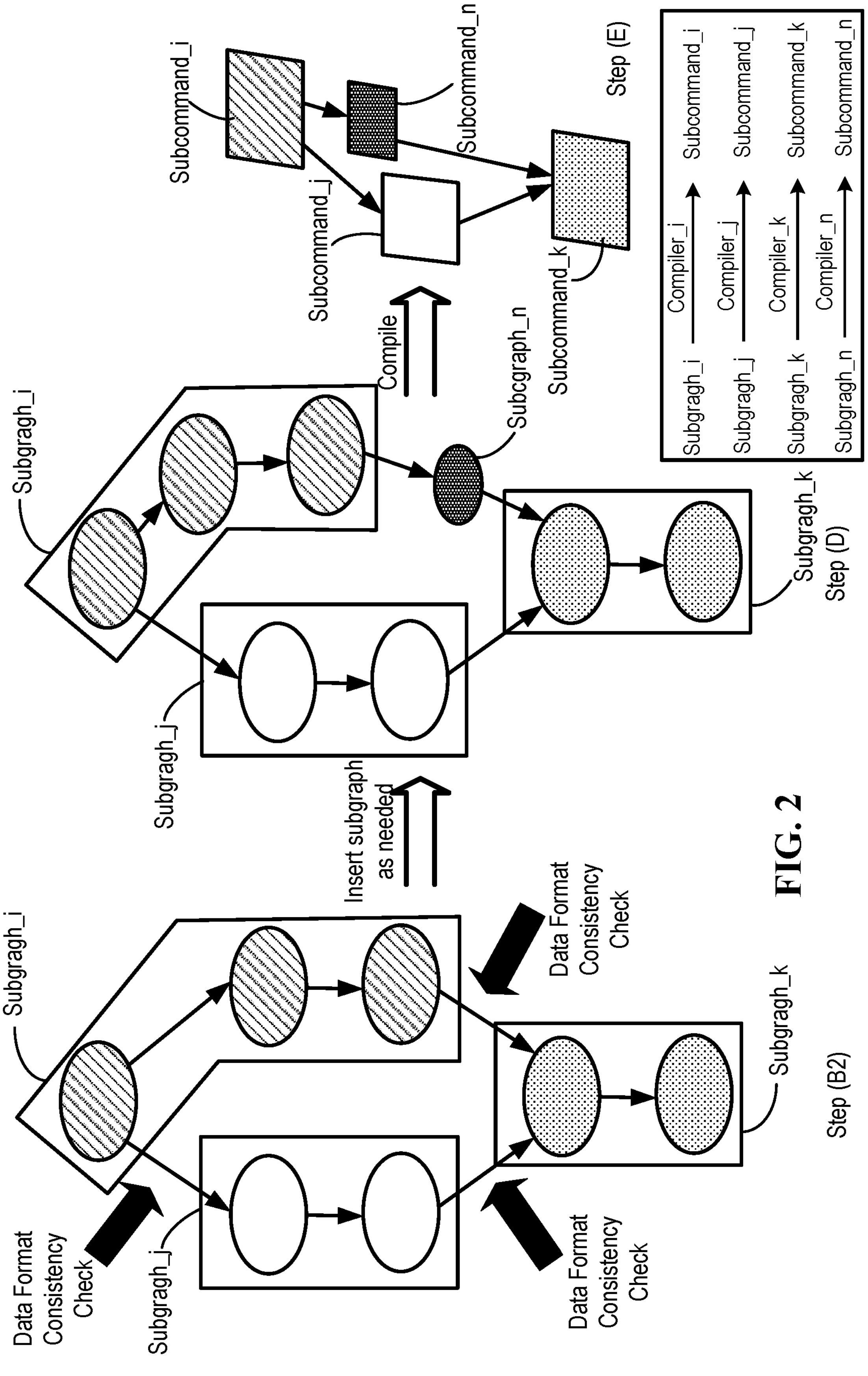
FIG. 2 is a diagram illustrating the insertion of a subgraph according to one embodiment.

FIG. 2 is a diagram illustrating the insertion of a subgraph according to one embodiment. Continuing with the example of FIG. 1, before compiling the subgraphs into corresponding subcommands, at step (B2) a data format consistency check is made at every edge; i.e., between any two adjacent subgraphs. If there is inconsistency in data formats between two adjacent subgraphs (e.g., subgraph_i and subgraph_k), step (D) of the process is invoked to insert a subgraph (e.g., subgraph_n) therebetween to convert the data formats. Step (E) of the process includes the respective compilers compiling the subgraphs into corresponding subcommands, where the subgraphs include the inserted subgraph_n, which is compiled by complier_n into subcommand n.

Figure 3:
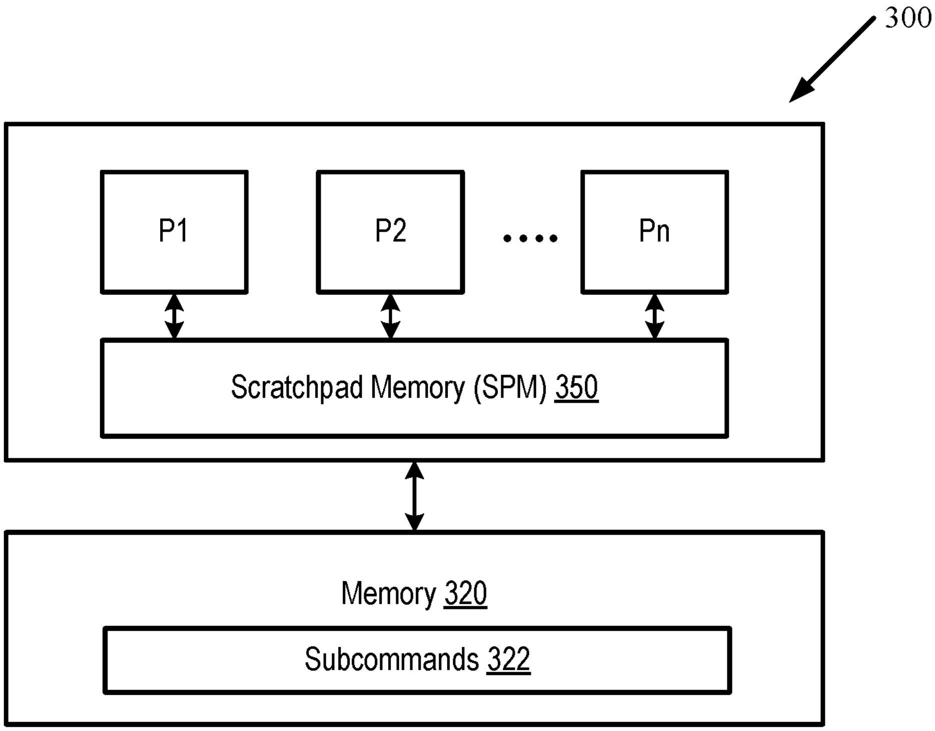
FIG. 3 is a block diagram illustrating a heterogeneous processing system for executing an NN model according to one embodiment.

FIG. 3 is a block diagram illustrating a heterogeneous computing system 300 ("system 300") according to one embodiment. System 300 includes multiple heterogeneous processors (also referred to as heterogeneous devices); e.g., P1, P2, . . . , Pn. The term "heterogeneous processors" as used herein refers to processors of different instruction set architectures (ISAs), processors designed for different sets of specific tasks, and/or processors using different data formats for memory access or input/output. Non-limiting examples include a deep learning accelerator (DLA), a vector processing unit (VPU), a direct memory access (DMA) device, a central processing unit (CPU), a digital signal processor (DSP), a neural processing unit (NPU), a graphics processing unit (GPU), etc. In one embodiment, the processors execute subcommands 322 compiled by respective target-specific compilers to perform neural network computing.

System 300 includes a scratchpad memory (SPM) 350 co-located with the processors; e.g., on the same chip. The processors and SPM 350 may be part of a multiprocessor system-on-a-chip (MPSoC). In one embodiment, SPM 350 may be a static random access memory (SRAM) or another type of fast memory. SPM 350 provides faster data access for the processors than off-chip memory 320. Non-limiting examples of memory 320 include a dynamic random access memory (DRAM) device, a flash memory device, and/or other volatile or non-volatile memory devices. Each compiler may obtain a portion of SPM 350 at compile time for its target device to use during the execution of a subcommand.

In one embodiment, system 300 may perform both compilation and execution. For example, memory 320 may store target-specific compilers and NN models, and one or more of the processors in system 300 (e.g., a CPU) may run the compilers to compile an NN model into subcommands 322 for execution by the processors. Alternatively, the compilers may be located on another machine and the compiled result (e.g., subcommands 322) is transferred to system 300 for execution.

Figure 4:
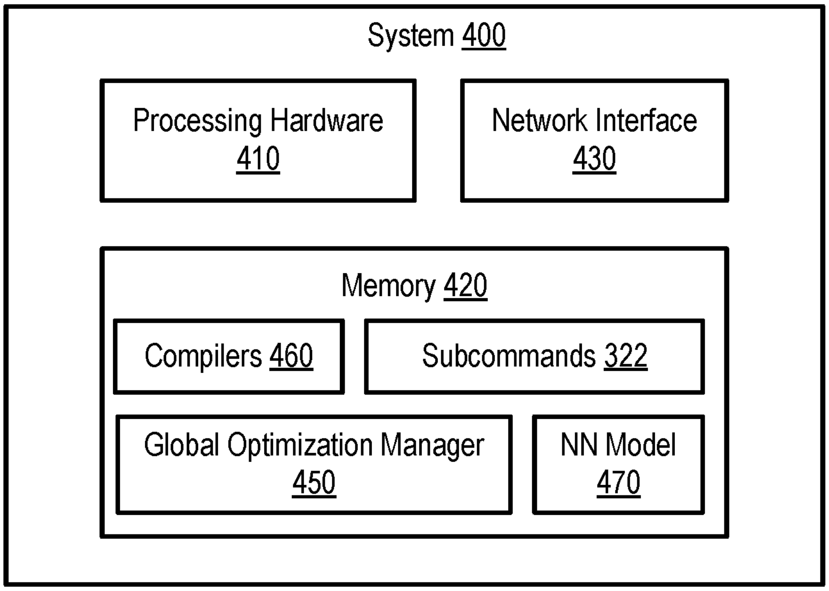
FIG. 4 is a block diagram of a system for compiling an NN model according to one embodiment.

FIG. 4 is a block diagram of a system 400 operative to compile an NN model 470 according to one embodiment. System 400 may be used when NN model compilation and execution are performed on two different machines. NN model 470 may be an example of NN model 100 in FIG. 1. System 400 includes processing hardware 410, a memory 420, and a network interface 430. It is understood that system 400 is simplified for illustration; additional hardware and software components are not shown. Non-limiting examples of processing hardware 410 may include one or more CPUs and/or processing units on which compilers 460 may run. Compilers 460 may be stored in memory 420, which may include a DRAM device, a flash memory device, and/or other volatile or non-volatile memory devices. Different compilers 460 may be used to compile different parts of NN model 470 into subcommands 322 for corresponding target devices (e.g., P1, P2, . . . , Pn, in FIG. 3). System 400 may transfer (e.g., by downloading) subcommands 322 to system 300 for execution through network interface 430, which may be a wired interface or a wireless interface.

In one embodiment, system 400 includes a global optimization manager 450 to allocate SPM 350 to compilers 460 for use by subcommand execution. The operations of global optimization manager 450 will be described later with reference to FIGS. 6-9. Referring to FIG. 3, in an embodiment where system 300 performs both compilation and execution of NN model 470, memory 320 may store global optimization manager 450, compilers 460, and NN model 470 to perform SPM allocation.

Figure 5:
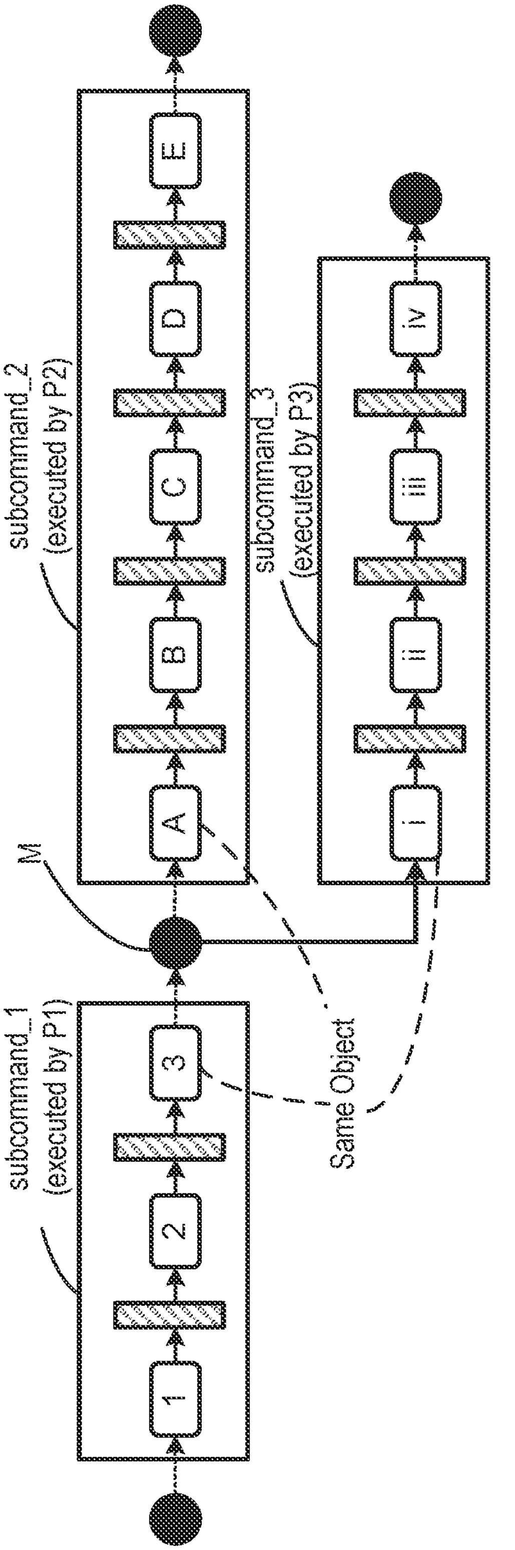
FIG. 5 is a diagram illustrating subcommands and objects operated by the subcommands according to one embodiment.

FIG. 5 is a diagram illustrating subcommands and objects operated by the subcommands according to one embodiment. Processors P1, P2, and P3 are heterogeneous processors. In this example, processor P1 is to execute subcommand_1 that operates on three objects identified by 1, 2, and 3; processor P2 is to execute subcommand_2 that operates on five objects identified by A, B, C, D, and E; and processor P3 is to execute subcommand_3 that operates on four objects identified by i, ii, iii, and iv. In one embodiment, each object is a tensor, which may be the input/output activation of a neural network operation (OP). The rectangular block between two objects represents an OP, which reads an input tensor and writes an output tensor. Each black circle represents an input/output point of a subcommand. The circle in the middle (labeled M) represents an output point of subcommand_1 and an input point of subcommand_2 and subcommand_3. That is, circle M is a linkage node for subcommand_1, subcommand_2, and subcommand_3. As tensors 3, A, and i are directly connected to the same linkage node, it means that tensors 3, A, and i are the same object and can be stored in the same memory location (e.g., a given SPM location). At compile time when SPM allocation is calculated, the given SPM location may be further allocated to any of tensors B-E and ii-iv, as long as no conflicts (e.g., data hazards) are caused by the allocation. As the three subcommands are compiled by different compilers and no direct inter-compiler communication exists, conflict prevention is achieved by a global optimization manager that coordinates the SPM allocation for the compilers. Thus, the global optimization manager provides a cooperative compiler framework for optimizing SPM allocation.

Figure 6:
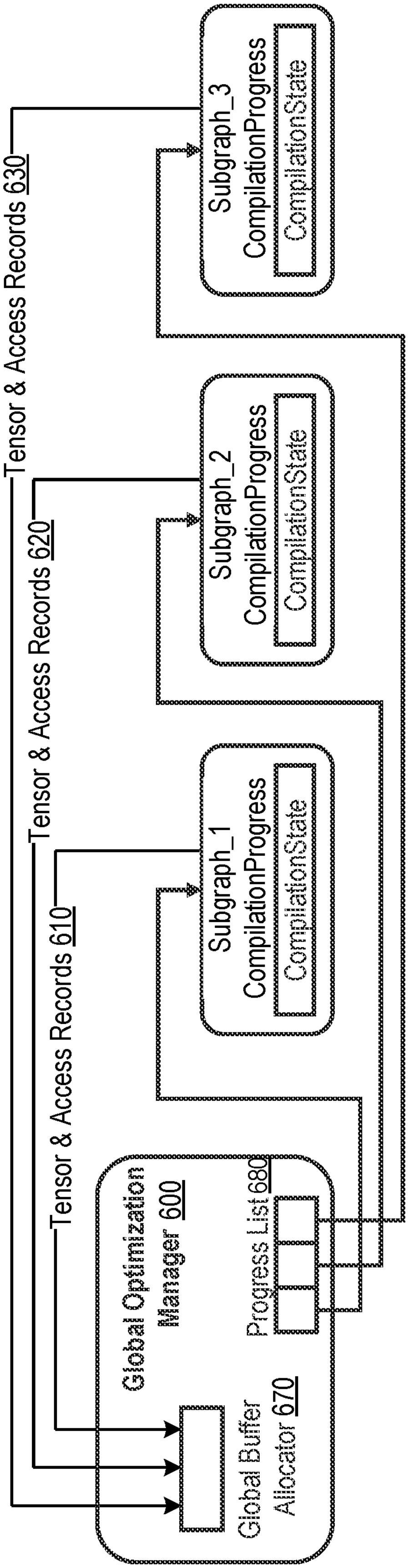
FIG. 6 is a diagram illustrating a global optimization manager according to one embodiment.

FIG. 6 is a diagram illustrating a global optimization manager 600 according to one embodiment. Global optimization manager 600 may be an example of global optimization manager 450 in FIG. 4. In this example, a neural network model includes three subgraphs (e.g., subgraph_1, subgraph_2, and subgraph_3) that are compiled by three corresponding compilers. At compile time, each compiler generates a compilation state that includes a tensor record and an access record. Global optimization manager 600 maintains a progress list 680 to keep track of the compilation progress of each subgraph. Global optimization manager 600 also includes a global buffer allocator 670 that receives the compilation states reported from the compilers. Global buffer allocator 670 determines tensor buffer allocation for all of the tensors in the tensor records generated by the compilers. The tensor buffer allocation includes SPM allocation to some or all of the tensors. Global buffer allocator 670 determines which tensors can be placed in which locations of the SPM, taking into account SPM space limitation, the dependency among the tensors, and the lifetime of the tensors. The resulting tensor placement may not satisfy every compiler, as some of the tensors may be left out of the SPM and need to be stored in DRAM. However, all of the compilers cooperate with global buffer allocator 670 by accepting the SPM allocation.

During the compilation process, each compiler generates a compilation state. In one embodiment, each compilation state may go through a number of state transitions during compilation. Initially, a begin state transitions into an I/O map ready state when a compiler generates an I/O map for the corresponding subgraph. The I/O map may be part of the compilation state. The I/O map indicates the input tensor ID and the output tensor ID, as well as the input data format and the output data format required by the target device. The I/O map ready state transitions into a tensor record ready state when the compiler generates a tensor record for the corresponding subgraph. The tensor record ready state transitions into an access record ready state when the compiler generates an access record for the corresponding subgraph. After the access record is generated, the state transitions into a done state indicating that the compilation state is ready to be read by global optimization manager 600 for SPM allocation.

In one embodiment, after a compiler generates an I/O map, the compiler suspends the compilation process and reports to global optimization manager 600 that the compilation state is ready for data format consistency check. After global optimization manager 600 reads the compilation states from all compilers that have I/O maps ready, it performs data format consistency checks and determines whether any new subgraphs are to be inserted, as shown in the example of FIG. 2. If a new subgraph is to be inserted into the graph representing the NN model, a corresponding compiler is invoked to compile the new subgraph. The compilers then resume the compilation process.

After the compilers resume the compilation process, each compiler further generates a tensor record and an access record in the compilation state. When a compiler has both the tensor record and the access record ready, it suspends the compilation process and reports to global optimization manager 600 that the compilation state is ready for SPM allocation. After global optimization manager 600 reads the compilation states from all compilers that have their tensor records and access records ready, it computes the SPM allocation and writes the allocation back to each compilation state. The compilers then resume the compilation process to generate subcommands.

FIG. 7 illustrates examples of tensor records and access records according to one embodiment. Referring also to FIG. 6, example (A) shows tensor and access records 610 generated from compiling subgraph_1. Example (B) shows tensor and access records 620 generated from compiling subgraph_2. Example (C) shows tensor and access records 630 generated from compiling subgraph_3. Taking tensor and access records 610 as an example, tensor and access records 610 include a tensor record 711 that records tensor ID, size, and category, among other attributes, of each tensor in subgraph_1. Tensor and access records 610 further include an access record 712 that records, for each OP in subgraph_1, an input tensor ID (i.e., the tensor read by the OP) and an output tensor ID (i.e., the tensor written by the OP). For example, the first column of access record 712 indicates that OP1 in subgraph_1 reads tensor 1 and writes tensor 2. The third column of access record 722 indicates that OP3 in subgraph_2 reads tensor C and writes tensor D. The global optimization manager 600 constructs a global view for SPM allocation based on the tensor IDs, the tensor records, and the access records.

Figure 8:
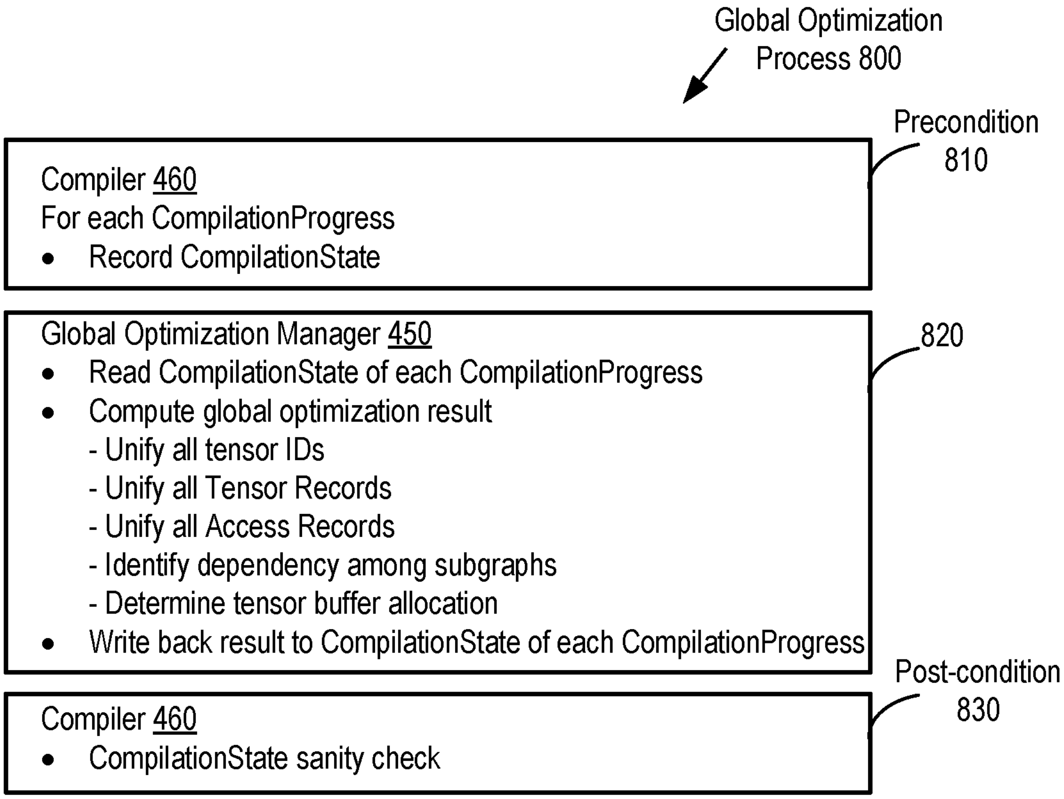
FIG. 8 is a diagram illustrating a global optimization process according to one embodiment.

FIG. 8 is a diagram illustrating a global optimization process 800 according to one embodiment. Referring also to FIG. 6, process 800 may be performed by global optimization manager 600 and target-specific compilers. Process 800 includes a precondition step 810 in which each compiler on progress list 680 (referred to as "CompilationProgress") records its compilation state including at least a tensor record and an access record. At step 820, global optimization manager 600 reads the compilation state of each CompilationProgress, and computes a global optimization result based on the compilation states of all compilers on progress list 680. The computation of the global optimization result includes the steps of unifying all tensor IDs, unifying all tensor records, and unifying all access records.

Referring to the example in FIG. 5 and FIG. 7, global optimization manager 600 determines that tensor IDs 3, A, and i identify the same tensor and can be unified into a single tensor ID across tensor records 711, 721, and 731. Global optimization manager 600 unifies two or more tensor IDs when it determines that these tensor IDs identify the same tensor. The determination may be based on the input tensor ID and the output tensor ID of each subgraph, as well as the linkage node between two subgraphs. After tensor IDs are unified (i.e., consolidated into a single tensor ID), the tensor records and the access records can also be unified. For example, tensor records 711, 721, and 731 can be unified into one unified tensor record with tensor IDs 3, A, i replaced by one single tensor ID. Access records 712, 722, and 732 may also be unified into a unified access record with three branches, and linkages can be established between input tensors and output tensors across different branches based on the read (input) and write (output) tensor IDs. The unified access record indicates the lifetime of each tensor, which is relied upon by global optimization manager 600 for SPM allocation.

The computation of the global optimization result further includes the steps of identifying dependency among subgraphs, determining tensor buffer allocation, and writing back the result to CompilationState of each CompilationProgress. The tensor buffer allocation includes allocating the SPM to the subgraphs based on the global knowledge of the compilation states. In one embodiment, allocation of the SPM may be formulated as an interval coloring problem, which can be solved by known algorithms. Process 800 further includes a post-condition step 830 in which each CompilationProgress performs a sanity check on the SPM allocation.

Figure 9:
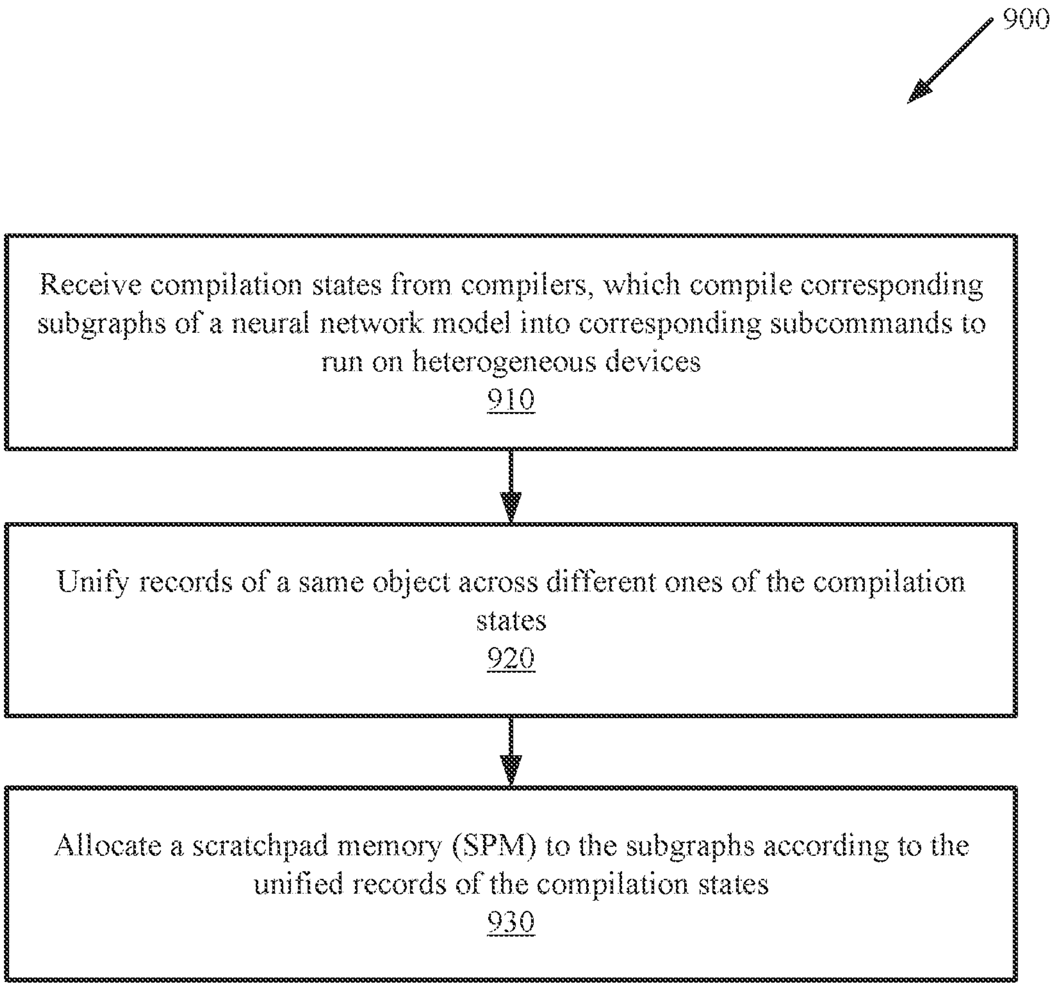
FIG. 9 is a flow diagram illustrating a method for SPM allocation in a computing system according to one embodiment.

FIG. 9 is a flow diagram illustrating a method 900 for allocating an SPM to heterogeneous devices for neural network computing according to one embodiment. In one embodiment, a system may perform method 900 using a global optimization manager. The system may include processing hardware and memory, and the memory may store instructions which, when executed by the processing hardware, cause the processing hardware to perform operations of the global optimization manager. The global optimization manager allocates an SPM to heterogeneous devices that execute respective subcommands for neural network computing. Non-limiting examples of the system that performs method 900 may include system 300 in FIG. 3 and system 400 in FIG. 4, on which a global optimization manager and multiple compilers can run. In one embodiment, the system that performs the compilation and SPM allocation may be the same as the heterogeneous computing system in which target devices reside. Alternatively, the system that performs the compilation and SPM allocation may be different from the heterogeneous computing system.

Method 900 starts at step 910 when the system receives compilation states from multiple compilers. The compilers compile corresponding subgraphs of a neural network model into corresponding subcommands that run on heterogeneous devices. The system at step 920 unifies the records of the same object across different compilation states. The system at step 930 allocates an SPM to the subgraphs according to the unified records of the compilation states.

In one embodiment, the system performs global optimization of SPM allocation based on the compilation states of the compilers. Each compiler is target device specific and is operative to compile a subgraph of the neural network model into a subcommand to run on a heterogeneous device in the heterogeneous computing system. Each compilation state includes a tensor record that indicates attributes of tensors in a corresponding subgraph. Each compilation state includes an access record that identifies an input tensor and an output tensor of a neural network operation in a corresponding subgraph.

In one embodiment, unifying the records includes unifying tensor IDs that identify the same object into a unified tensor ID; unifying tensor records into a unified tensor record based on the unified tensor ID; and unifying access records into a unified access record based on the unified tensor ID. The unified access record indicates the lifetime information of each tensor in the unified tensor record, and the SPM allocation is based on, at least in part, the lifetime information. The system writes back the results of the SPM allocation to the compilation states of the compilers for the compilers to resume compiling.

In one embodiment, the compilation states include respective I/O maps that identify input and output tensors and input and output data formats. When the system detects different data formats between an input and an output of two adjacent subgraphs in the neural network model, a new subgraph is inserted between the two adjacent subgraphs to perform data format conversion. The compilation states from the compilers for SPM allocation include a new compilation state for the new subgraph.

The operations of the flow diagram of FIG. 9 have been described with reference to the exemplary embodiments of FIGS. 3, 4, and 6. However, it should be understood that the operations of the flow diagram of FIG. 9 can be performed by embodiments of the invention other than the embodiments of FIGS. 3, 4, and 6, and the embodiments of FIGS. 3, 4, and 6 can perform operations different than those discussed with reference to the flow diagram. While the flow diagram of FIG. 9 shows a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for allocating scratchpad memory (SPM) at compile time for neural network computing, comprising:

maintaining a progress list by a global optimization manager to keep track of compilation progress of compilers compiling subgraphs of a neural network model, wherein each compiler on the progress list compiles a corresponding subgraph for execution on a different one of heterogeneous devices and records a corresponding compilation state describing attributes of tensors in the corresponding subgraph;

suspending compilation of a subgraph by a given compiler on the progress list when the given compiler's corresponding compilation state is ready for SPM allocation;

computing, by the global optimization manager, a global optimization result based on compilation states of all of the compilers on the progress list, wherein computing the global optimization result includes unifying records of the corresponding compilation state of each compiler across the subgraphs of the neural network model;

allocating, by the global optimization manager, the SPM to the subgraphs according to the unified records of the corresponding compilation state of each compiler, wherein the compilers cooperate with the global optimization manager by accepting the SPM allocation; and resuming compilation of the subgraphs with the SPM allocation incorporated into the compilation states of the compilers.

2. The method of claim 1, wherein each compiler is target-device specific and is operative to compile the corresponding subgraph of the neural network model into a subcommand to run on one of the heterogeneous devices.

3. The method of claim 1, wherein each compilation state of the compilation states includes a tensor record that indicates at least tensor identifiers (IDs).

4. The method of claim 1, wherein each compilation state of the compilation states includes an access record that identifies an input tensor and an output tensor of a neural network operation.

5. The method of claim 1, wherein unifying the records of the corresponding compilation state of each compiler comprises:

unifying tensor IDs that identify a same object into a unified tensor ID;

unifying tensor records into a unified tensor record based on the unified tensor ID; and unifying access records into a unified access record based on the unified tensor ID.

6. The method of claim 5, wherein the unified access record indicates lifetime information of each tensor in the unified tensor record, and the SPM allocation is based on, at least in part, the lifetime information.

7. The method of claim 1, further comprising:

writing back the SPM allocation to the compilation states of the compilers on the progress list for the compilers to resume compiling.

8. The method of claim 1, wherein the compilation states include respective I/O maps that identify input and output tensors and input and output data formats.

9. The method of claim 1, further comprising:

detecting different data formats between an input and an output of two adjacent subgraphs in the neural network model; and inserting a new subgraph between the two adjacent subgraphs to perform data format conversion.

10. A system operative to allocate scratchpad memory (SPM) at compile time for neural network computing, comprising:

processing hardware including heterogeneous devices; and memory to store instructions, when executed by the processing hardware, cause the processing hardware to perform operations of compilers and a global optimization manager, the processing hardware operative to:

maintain a progress list by the global optimization manager to keep track of compilation progress of the compilers compiling subgraphs of a neural network model, wherein each compiler on the progress list compiles a corresponding subgraph for execution on a different one of the heterogeneous devices and records a corresponding compilation state describing attributes of tensors in the corresponding subgraph;

suspend the compilation of the corresponding subgraph by a given compiler on the progress list when the given compiler's corresponding compilation state is ready for SPM allocation;

compute, by the global optimization manager, a global optimization result based on compilation states of all of the compilers on the progress list, wherein computing the global optimization result includes unifying records of the corresponding compilation state of each compiler across the subgraphs of the neural network model;

allocate, by the global optimization manager, the SPM to the subgraphs according to the unified records of the corresponding compilation state of each compiler, wherein the compilers cooperate with the global optimization manager by accepting the SPM allocation; and resume compilation of the subgraphs with the SPM allocation incorporated into the compilation states of the compilers.

11. The system of claim 10, wherein each compiler is target-device specific and is operative to compile the corresponding subgraph of the neural network model into a subcommand to run on one of the heterogeneous devices.

12. The system of claim 10, wherein each compilation state of the compilation states includes a tensor record that indicates at least tensor identifiers (IDs).

13. The system of claim 10, wherein each compilation state of the compilation states includes an access record that identifies an input tensor and an output tensor of a neural network operation.

14. The system of claim 10, wherein the global optimization manager is further operative to:

unify tensor IDs that identify a same object into a unified tensor ID;

unify tensor records into a unified tensor record based on the unified tensor ID; and unify access records into a unified access record based on the unified tensor ID.

15. The system of claim 14, wherein the unified access record indicates lifetime information of each tensor in the unified tensor record, and the SPM allocation is based on, at least in part, the lifetime information.

16. The system of claim 10, wherein the global optimization manager is further operative to:

write back results of the SPM allocation to the compilation states of the compilers on the progress list for the compilers to resume compiling.

17. The system of claim 10, wherein the compilation states include respective I/O maps that identify input and output tensors and input and output data formats.

18. The system of claim 10, wherein the global optimization manager is further operative to:

detect different data formats between an input and an output of two adjacent subgraphs in the neural network model; and insert a new subgraph between the two adjacent subgraphs to perform data format conversion.

* * * * *